US008468100B2

(12) United States Patent
Veugen et al.

(10) Patent No.: US 8,468,100 B2
(45) Date of Patent: Jun. 18, 2013

(54) ISSUING ELECTRONIC VOUCHERS

(75) Inventors: Thijs Veugen, Voorburg (NL); Luuk Danes, Meppel (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 105 days.

(21) Appl. No.: 12/671,462

(22) PCT Filed: Jul. 30, 2008

(86) PCT No.: PCT/NL2008/050521
§ 371 (c)(1),
(2), (4) Date: Jun. 10, 2010

(87) PCT Pub. No.: WO2009/017408
PCT Pub. Date: Feb. 5, 2009

(65) Prior Publication Data
US 2010/0257111 A1    Oct. 7, 2010

(30) Foreign Application Priority Data
Jul. 31, 2007   (EP) .................................. 07113541

(51) Int. Cl.
*G06Q 20/00*   (2012.01)
(52) U.S. Cl.
USPC ................. 705/66; 705/64; 705/65; 705/69; 713/168; 713/176; 713/172
(58) Field of Classification Search
USPC ........................................................ 705/66
See application file for complete search history.

(56) References Cited

U.S. PATENT DOCUMENTS

| | | | | |
|---|---|---|---|---|
| 4,914,698 A * | 4/1990 | Chaum | ........................... | 380/30 |
| 4,949,380 A * | 8/1990 | Chaum | ........................... | 380/30 |
| 4,987,593 A   | 1/1991 | Chaum | | |
| 5,511,121 A * | 4/1996 | Yacobi | .......................... | 705/69 |
| 5,671,279 A * | 9/1997 | Elgamal | ......................... | 705/79 |
| 5,671,280 A * | 9/1997 | Rosen | ............................ | 705/67 |
| 5,768,385 A * | 6/1998 | Simon | ............................ | 705/69 |

(Continued)

FOREIGN PATENT DOCUMENTS

| | | |
|---|---|---|
| EP | 0 823 694 A | 2/1998 |
| WO | WO 00/30045 A | 5/2000 |
| WO | WO 01/43094 A | 6/2001 |
| WO | WO 01/99070 A | 12/2001 |

OTHER PUBLICATIONS

International Search Report for PCT/NL2008/050521, dated Oct. 24, 2008.

*Primary Examiner* — Jacob C. Coppola
(74) *Attorney, Agent, or Firm* — Leydig, Voit & Mayer, Ltd.

(57) ABSTRACT

A method of issuing electronic vouchers ($V_i$) which a user (U) may submit to a merchant (M) in exchange for goods or services comprises the steps of: an issuer (I) receiving an electronic declaration ($D_{i-1}$) from the user (U), the issuer verifying the electronic declaration ($D_{i-1}$), and the issuer issuing a new electronic voucher ($V_i$) for use with the merchant (M) only if the electronic declaration comprises a signature ($S_M$) of a merchant on a previous electronic voucher ($V_{i-1}$). The vouchers ($V_i$) and declarations ($D_{i-1}$) are preferably blinded by the user such that the user remains anonymous. However, the electronic vouchers ($V_i$) may contain the identity (Q) of the user (U), which identity may be revealed when a voucher is submitted more than once.

5 Claims, 1 Drawing Sheet

U.S. PATENT DOCUMENTS

| | | | |
|---|---|---|---|
| 5,832,089 A * | 11/1998 | Kravitz et al. | 705/69 |
| 5,839,119 A * | 11/1998 | Krsul et al. | 705/39 |
| 5,878,138 A * | 3/1999 | Yacobi | 705/69 |
| 5,903,880 A | 5/1999 | Biffar | |
| 6,047,269 A * | 4/2000 | Biffar | 705/39 |
| 6,076,078 A * | 6/2000 | Camp et al. | 705/65 |
| 6,205,435 B1 * | 3/2001 | Biffar | 705/41 |
| 6,223,166 B1 * | 4/2001 | Kay | 705/5 |
| 6,327,578 B1 * | 12/2001 | Linehan | 705/65 |
| 6,438,691 B1 * | 8/2002 | Mao | 713/176 |
| 6,446,052 B1 * | 9/2002 | Juels | 705/69 |
| 6,529,884 B1 * | 3/2003 | Jakobsson | 705/64 |
| 6,636,969 B1 * | 10/2003 | Jakobsson et al. | 713/180 |
| 2001/0005839 A1 * | 6/2001 | Maenpaa et al. | 705/65 |
| 2002/0002538 A1 * | 1/2002 | Ling | 705/41 |
| 2002/0059109 A1 * | 5/2002 | Takagi | 705/26 |
| 2003/0026396 A1 * | 2/2003 | Weik et al. | 379/93.12 |
| 2003/0061170 A1 * | 3/2003 | Uzo | 705/64 |
| 2003/0200120 A1 * | 10/2003 | Binkert | 705/3 |
| 2003/0229790 A1 * | 12/2003 | Russell | 713/172 |
| 2004/0059674 A1 * | 3/2004 | Hatano et al. | 705/40 |
| 2005/0049897 A1 * | 3/2005 | Kameda | 705/2 |
| 2007/0244812 A1 * | 10/2007 | Turk et al. | 705/39 |
| 2008/0228651 A1 * | 9/2008 | Tapsell | 705/65 |
| 2010/0094760 A1 * | 4/2010 | Gouget et al. | 705/71 |
| 2010/0257111 A1 * | 10/2010 | Veugen et al. | 705/318 |

* cited by examiner

ISSUING ELECTRONIC VOUCHERS

FIELD OF THE INVENTION

The present invention relates to issuing electronic vouchers. More in particular, the present invention relates to a method of and a device for producing and/or issuing electronic vouchers which may be submitted to a merchant in exchange for goods and/or services.

BACKGROUND

It is known to issue electronic vouchers which may be exchanged for goods and services. European Patent Application EP 0 823 694 (KPN) discloses electronic "tickets" or vouchers which may be stored in a smart card, while International Patent Application WO 00/30045 (KPN) discloses electronic vouchers which may also be printed. The vouchers of WO 00/30045 contain identification data for identifying the service to be rendered.

These electronic vouchers may be purchased using regular money and may then be stored on a smart card which a user carries in her purse. The smart card is used at a point of sale to submit the voucher in exchange for goods or services. Instead of electronic vouchers, electronic coins are sometimes used.

A problem that may occur with electronic vouchers or electronic money is fraudulent use: a user may be able to spend the same voucher or coin twice. The electronic vouchers of WO 00/30045 are "stamped" when used so as to prevent their being used more than once. However, fraudulent users may find ways to prevent or even undo this "stamping" and use the same voucher again. Accordingly, a fraudulent user may commit fraud repeatedly.

U.S. Pat. No. 4,987,593 (Chaum) discloses an electronic cash system using digital signatures. Certain information contained in the electronic cash can be recovered under certain conditions, thus allowing to identify fraudulent users of the system. However, fraud may only be detected when a user spends an electronic cash item more than once ("double spending"). This does not stop a fraudulent user from receiving new electronic cash, nor is there a guarantee that the user uses the goods or services obtained with the cash in an honest and legal manner. Accordingly, this known system is capable of identifying double spending users but may still issue new electronic cash in case of fraud.

SUMMARY OF THE INVENTION

It is an object of the present invention to overcome these and other problems of the Prior Art and to provide a method of and a device for issuing electronic vouchers which a user may submit to a merchant in exchange for goods or services, which method and device have an improved resistance to fraud.

It is a further object of the present invention to provide a method of and a device for issuing electronic vouchers which prevents fraudulent users from committing fraud repeatedly.

Accordingly, the present invention provides a method of issuing electronic vouchers which a user may submit to a merchant in exchange for goods or services, the method comprising the steps of:

an issuer receiving an electronic declaration from the user,
the issuer verifying whether the electronic declaration comprises a signature of a merchant on a previous electronic voucher, and
the issuer providing a signature on a new electronic voucher only if the electronic declaration comprises said signature.

By only signing a new electronic voucher, and thus issuing a valid new electronic voucher, if an electronic declaration received from the user contains a signature from a merchant, it is ensured that only bona fide users receive new vouchers. Each time a user (for example a consumer) uses a voucher to obtain goods and/or services, and therefore surrenders her voucher in exchange for goods and/or services, the merchant providing those goods and/or services may sign the voucher if it is found to be valid. This signature put by a merchant on a valid spent voucher is evidence that the user was not fraudulent. By submitting this signed spent voucher to the issuer, a new electronic voucher may be obtained. Without this declaration, the issuer will not issue a new electronic voucher to this user.

Those skilled in the art will recognise that a signature placed on an electronic voucher is an electronic signature involving cryptographic techniques, as will be explained later in more detail.

The vouchers preferably each have a unique identification (for example a serial number) which allows them to be distinguished from other vouchers so as to check whether they are used only once. The inventive feature of requiring a valid (that is, signed) declaration prevents a fraudulent user from receiving new vouchers.

In the method of the present invention, the issuer verifies whether the electronic declaration comprises a signature of a merchant on a previous electronic voucher. As the first electronic voucher will have no previous electronic voucher and hence no declaration, it is preferred that the issuer provides a signature on a first electronic voucher for the user in the absence of a declaration. This ensures that the user can receive a first electronic voucher. Any subsequent electronic vouchers will typically be issued only when a valid declaration can be presented. It is further preferred that each user may receive a first signed electronic voucher in the absence of a declaration. However, embodiments can be envisaged in which only a limited number of users receive a first signed electronic voucher without having presented a validly signed electronic declaration, this limited number of users possibly being limited to a single user.

The electronic vouchers may be made by the issuer. However, this would limit the privacy of the user, as the issuer would have all information concerning the voucher. In a preferred embodiment of the present invention, therefore, the step of receiving an electronic declaration further includes receiving from the user the new electronic voucher to be signed. That is, the electronic vouchers are not made by the issuer but by the user or another party, and are transferred to the issuer, preferably together with the electronic declaration.

The electronic vouchers may contain information identifying the user or the merchant where the voucher is to be spent. In order not to disclose this information to the issuer, the user may advantageously blind the electronic voucher prior to its receipt by the issuer. This blinding may be carried out by the user multiplying the electronic voucher by a first blinding factor raised to a power equal to a public key of the issuer (modulo N), which first blinding factor is preferably equal to a random number raised to a power equal to a public key of the merchant (modulo N), where N is a large integer equal to a product of prime numbers. As will become apparent later from the detailed description of the invention, multiplying the electronic voucher by the said first blinding factor raised to the power equal to a public key of the issuer provides a very effective and efficient blinding scheme.

Instead of, or in addition to blinding the electronic voucher, the user may also blind the electronic declaration prior to its receipt by the issuer, to avoid the issuer obtaining information regarding the goods or services previously acquired. More in particular, the user may advantageously multiply the electronic declaration by a second blinding factor raised to a power equal to a public key of the issuer (modulo N), which second blinding factor preferably is a random number.

The method of the present invention allows electronic vouchers to be produced, issued and spent anonymously while ensuring that fraudulent users will not receive any new electronic vouchers. In a preferred embodiment, it is further possible to determine the identity of a fraudulent user who uses the same voucher more than once. To this end, the electronic voucher may contain the concealed identity of the user, which identity may be revealed if the electronic voucher is submitted to a merchant more than once. More in particular, the electronic voucher may in this embodiment be obtained by adding the identity of the user to a random number to obtain a sum value, using the sum value and a first one-way function to produce a first intermediate value, using the random number and the first one-way function to produce a second intermediate value, and using the first and second intermediate values and a second one-way function to produce the electronic voucher.

An electronic voucher obtained in this way contains the identity of the user, but the one-way functions and the random number prevent this identity to be determined under normal circumstances. However, if the user is required to submit either the sum value and the second intermediary value, or the random number and the first intermediate value, every time an electronic voucher offered to a merchant, it will generally be possible for the merchant to determine the identity from the sum value and the random value if the electronic voucher is offered more than once.

Signatures on the electronic vouchers and declarations may be obtained in various ways. It is preferred, however, to obtain a signature by raising a value to be signed to a power, wherein the power is the inverse (modulo a function of N, where N is a predetermined integer) of a public key of the signing entity.

In the present invention it is preferred that a signed electronic voucher comprises an unsigned electronic voucher as well as the issuer's signature on the unsigned electronic voucher.

The present invention also provides a method of using an electronic voucher produced by the method defined above, the method comprising the steps of:
the user submitting the electronic voucher to a merchant,
the merchant verifying whether the electronic voucher comprises the signature of the issuer, and
the merchant only providing goods or services if the electronic voucher comprises said signature of the issuer.
In a preferred embodiment, the step of submitting the electronic voucher further comprises submitting either a first intermediate value and a random number or a second intermediate value and a sum value involving an identification of the user, so as to be able to determine the identification of the user when the same voucher is received more than once.

The present invention additionally provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

The present invention also provides a device for issuing electronic voucher which a user may submit to a merchant in exchange for goods or services, the device comprising:
a receiving unit for receiving an electronic declaration from the user,
a verification unit for verifying whether the electronic declaration comprises a signature of the merchant on a previous electronic voucher, and
an issuing unit for providing a signature on a new electronic voucher only if the electronic declaration comprises said signature of the merchant.
The device has the same advantages as the method discussed above.

The present invention further provides a system for providing goods and/or services in exchange for vouchers, the system comprising an issuing device as described above. The system preferably further comprises at least one user device and at least one merchant device for use in the method defined above.

BRIEF DESCRIPTION OF THE DRAWINGS

The present invention will further be explained below with reference to exemplary embodiments illustrated in the accompanying drawings, in which.

DETAILED OF THE DRAWINGS

Figure 1:
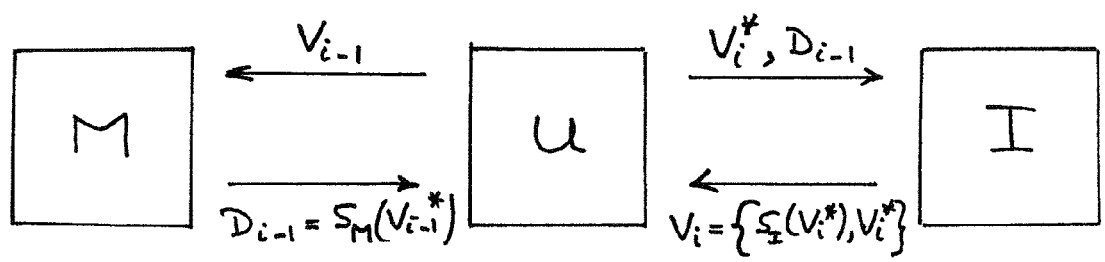
FIG. 1 schematically shows the exchange of data between a user, a merchant and an issuer in accordance with the present invention.

The exchange of data between a user U, an issuer I and a merchant M is schematically represented in FIG. 1. The user U may be a person carrying a smart card, an electronic wallet or a similar device. In the case of Internet transactions, the user may be a person having a computer or similar device at her disposal. The merchant M may be a shop having a cash register arranged for electronic payments, or a similarly equipped theatre, sports venue, bus station or other entity providing goods and/or services in exchange for electronic vouchers. In the case of Internet transactions, there may be no device for electronic transactions present at the actual shop or theatre, the electronic transactions taking place at a remote server. The issuer I may be a bank, post office, municipal office or other entity arranged for issuing electronic vouchers.

In the method of the present invention, the "issuing" of electronic vouchers $V_i$ involves signing unsigned vouchers $V_i^*$, that is, applying an electronic signature $S_I$ of the issuer I to an unsigned electronic voucher $V_i^*$, and then combining the electronic signature thus formed with the unsigned voucher $V_i^*$:

$$V_i = \{S_I(V_i^*), V_i^*\} \quad (1)$$

In other words, a signed voucher $V_i$ is a combination of an unsigned voucher $V_i^*$ and the issuer's signature $S_I(V_i^*)$ on that unsigned voucher $V_i^*$. The said combination preferably comprises a concatenation. The unsigned electronic vouchers $V_i^*$ are, in the example shown, provided by the user U.

The merchant M accepts signed electronic vouchers $V_i$ having the format of formula (1) and thus comprising their unsigned counterparts $V_i^*$. The signature of each electronic voucher $V_i$ received by the merchant M is checked. Unsigned vouchers $V_i^*$ not accompanied by a signature $S_I(V_i^*)$, or accompanied by an incorrect signature, are rejected.

In accordance with the present invention, the issuer I only produces a new, signed electronic voucher $V_i$ if the issuer I has received a declaration $D_{i-1}$. This declaration $D_{i-1}$ is produced by the merchant M and is given to the user U only if the user behaved correctly, that is, if the previous electronic voucher $V_{i-1}$ was valid and was used only once. This declaration $D_{i-1}$ preferably is a signed version of the previous (unsigned) electronic voucher $V_{i-1}^*$:

$$D_{i-1}=S_M(V_{i-1}^*) \qquad (2),$$

where $S_M$ is an electronic signature of the merchant M. In other words, the merchant signs and returns the spent voucher to the user if, and only if, the user proved to be bona fide. Subsequently, the user only receives a new signed voucher $V_i$ from the issuer if the previous voucher $V_{i-1}^*$ was signed by the merchant. In this way, fraudulent users are prevented from receiving new vouchers.

The electronic vouchers $V_i$ used in the present invention are represented by, or comprise, integer numbers. These numbers are preferably determined by the user or her electronic wallet or smart card. In a preferred embodiment, an (unsigned) electronic voucher $V_i^*$ has the following format:

$$V_i^*=G(F(a_i),F(a_i+Q)) \qquad (3),$$

where $a_i$ is a random number, Q is the identity of the user, and F and G are one-way functions. As is well known by those skilled in the art, it is easy to calculate the value of a one-way function (e.g. F) given an input variable (e.g. $a_i$), but it is practically impossible to determine the inverse of the function, that is, to calculate the value of the input variable given the value of the one-way function.

The random number $a_i$ may be generated by the user device (e.g. a smart card), while the identity Q may be an identity number associated with the user device. An electronic voucher that is determined using the above formula (3) is therefore a number which is dependent on the identity of the user. However, the one-way functions F and G prevent this identity being determined by the merchant or the issuer. Only if additional information is provided can the identity Q be derived from the (value of the) voucher. The one-way function G even prevents the intermediate values $F(a_i)$ and $F(a_i+Q)$ being determined from the value of the voucher $V_i^*$.

According to a further aspect of the present invention, the identity Q of the user may be revealed if the user tries to submit the same voucher more than once. This can be achieved if the user is required to submit either the intermediate value $F(a_i)$ and the sum value $(a_i+Q)$, or the random value $a_i$ and the intermediate value $F(a_i+Q)$ to the merchant when submitting a voucher. When submitting the same voucher containing the same random number $a_i$ twice, it is very likely (and in on-line embodiments even certain) that the merchant will have obtained both $a_i$ and $(a_i+Q)$, allowing the identity Q to be determined.

It will be understood that the choice of the pair of values to be submitted to the merchant is determined by the merchant, not by the user. The merchant (device) may compile a list of users who submitted vouchers, using the list to determine which pair of values is to be submitted. In on-line embodiments, such a list may be centrally stored, for example at the issuer. Alternatively, the merchant may randomly request a pair of values.

Submitting either the intermediate value $F(a_i)$ and the sum value $(a_i+Q)$, or the random value $a_i$ and the intermediate value $F(a_i+Q)$ to the merchant serves another purpose: using the functions F and G, the merchant can check whether the voucher $V_i^*$ is correct, that is, whether $V_i^*=G(F(a_i), F(a_i+Q))$ holds.

The signatures $S_I$ and $S_M$ used in the present invention preferably involve raising a number (such as the number representing an electronic voucher) to a power equal to the inverse of a public key:

$$S_I(V_i^*)=(V_i^*)^{1/KI} \qquad (4),$$

where KI is the public key of the issuer I. Similarly, the signature of the merchant can be written as:

$$S_M(V_{i-1}^*)=(V_{i-1}^*)^{1/KM} \qquad (5),$$

where KM is the public key of the merchant M.

As is usual in cryptographic calculations, the numbers are calculated modulo N. This makes the inverse extremely difficult to determine. As a result, the inverse of a public key is known only to a single parties, even though all parties know the public key.

Accordingly, the merchant M can verify the signature of the issuer I by raising the signed voucher $V_i$ to a power equal to the issuer's public key KI: $S_I(V_i^*)^{KI}=((V_i^*)^{1/KI})^{KI}=V_i^*$, if the signature $S_I$ was correct. Similarly, the issuer I can verify whether the declaration $D_{i-1}$ is equal to the previous voucher signed by the merchant M (in fact, signed by both the merchant M and the issuer I) by raising the declaration $D_i$ to a power (modulo N) equal to the public key of the merchant M: $(D_{i-1})^{KM}=((V_{i-1}^*)^{1/KM})^{KM}=V_{i-1}^*$, if the signature $S_M$ was correct. This verification mechanism makes use of the fact that a public key is available but that calculating the inverse of a public key, modulo N, is not feasible, as mentioned above.

The description above explains a basic embodiment of the present invention. In preferred embodiments, blinding factors are used to protect the anonymity of the user, and also provide an additional verification mechanism. These additional features are preferably used jointly, but either one may be omitted from an embodiment without departing from the present invention.

A preferred embodiment of the present invention comprises the following steps. It will be assumed that the user has received a declaration from the merchant after spending a previous voucher, and that the user and/or the issuer have determined a user identifier Q which is known to both.

The user device first produces a plurality of random numbers $a_i$ and $s_i$ with $i=1, \ldots M$ (different values of M may exist for $a_i$ and $s_i$). A number $s_i$ is used to produce a (first) blinding factor $r_i$ by raising $s_i$ to a power equal to KM (modulo N), where KM is the public key of the merchant M where the user intends to spend the voucher:

$$r_i=s_i^{KM} \qquad (6).$$

Using the random number $a_i$ and the user's identification Q, the user device also produces (unsigned) vouchers $V_i^*$ according to formula (3) above:

$$V_i^*=G(F(a_i),F(a_i+Q)) \qquad (3'),$$

where F and G are one-way functions. The user (device) then produces numbers $x_i$ to be submitted to the issuer I, where:

$$x_i=r_i^{KI} \cdot V_i^* \qquad (7),$$

where '·' denotes multiplication (modulo N) and KI is the public key of the issuer I, as before.

In a particularly preferred embodiment, the user submits k numbers $x_i$ to the issuer I, where k is an integer greater than 1. Accordingly, the issuer receives the numbers $x_1, \ldots, x_k$ and requests the user to 'open' $(k-1)$ of these numbers. That is, the user is requested to disclose the $a_i$ and $s_i$ of these (k−1) numbers $x_i$, thus allowing the issuer to verify whether the vouchers $V_i^*$ are correct.

If these vouchers are correct, the issuer signs the remaining number $x_i$ and the user receives the signed number $S_I(x_i)$. As $x_i = r_i^{KI} \cdot V_i^*$ and $S_I(x_i) = x_i^{1/KI}$, the signed number $S_I(x_i)$ is equal to $x_i^{1/KI} = (r_i^{KI} \cdot V_i^*)^{1/KI} = r_i \cdot (V_i^*)^{1/KI} = r_i \cdot (V_i^*)$. The issuer records the issuance of a voucher, for example by recording the number representing the value $V_i$ and any serial number of the voucher.

The user then only needs to divide the signed number $S_I(x_i)$ by $r_i$ to obtain the signed voucher $V_i$. The user may also check the signature by raising $S_I(x_i)$ to a power equal to the public key KI, thus obtaining $x_i$ if the signature $S_I$ is correct.

The voucher $V_i$ may now be spent at the merchant M. To this end, the user submits the signed voucher $V_i$ (which comprises the corresponding unsigned voucher $V_i^*$) to the merchant M, who checks the issuer's signature by raising the signature $S_I(V_i^*)$ to a power equal to the issuer's public key KI and comparing the result with the unsigned voucher $V_i^*$, as before. The signed voucher $V_i$ is preferably stored by the merchant for a comparison with future vouchers.

The merchant then asks the user to 'open' the (unsigned) voucher $V_i^*$ by submitting either $F(a_i)$ and $(a_i+Q)$ or $a_i$ and $F(a_i+Q)$, see formula (3). The merchant stores these values and uses them to check the voucher $V_i^*$. The merchant may also check whether a voucher having the same value has been submitted before by comparing the voucher with previously submitted vouchers.

If the voucher is found to be valid and is submitted for the first time, the goods and/or services for which the voucher was spent will be provided. In addition, if the voucher is submitted for the first time, the merchant M provides a declaration $D_i$ equal to the spent voucher $V_i^*$ signed by the merchant: $D_i = S_M(V_i^*) = (V_i^*)^{1/KM}$, where KM is the merchant's public key.

In the preferred embodiments of the present invention, instead of submitting the declaration $D_i$ to the issuer, the user submits a (blinded) declaration $d_i$ using a (second) blinding factor equal to a number $s_i$ raised to a power equal to the issuer's public key KI:

$$d_i = s_i^{KI} \cdot D_i = s_i^{KI} \cdot S_M(V_i^*) \qquad (8),$$

where $s_i$ is the random number corresponding with the voucher $V_i$, as above. This blinding factor $s_i^{KI}$ hides information identifying the goods and/or services acquired by the user. Still, the issuer is able to verify that $d_i = S_M(x_i)$, with $x_i$ being the number the issuer received before:

$$S_M(x_i) = S_M(r_i^{KI} \cdot V_i^*) = S_M((s_i^{KM})^{KI} \cdot V_i^*) = S_M(s_i^{KM \cdot KI}) \cdot S_M(V_i^*) = s_i^{KI} \cdot S_M(V_i^*) = d_i.$$

If this verification is successful, the issuer will record that the voucher $V_i$ associated with $x_i$ has been spent and will lower the counter for vouchers outstanding with one.

Various modifications are possible. The issuer may use different electronic signatures for different types of goods and/or services, or may use a single electronic signature for all types of goods and services. The vouchers may contain more information, for example a date or the number of persons the voucher is valid for. In general, an unsigned voucher may be written as:

$$V_i^* = G(F(a_i), F(a_i+Q), X) \qquad (3a),$$

where X is additional information, which may comprise a date. In another embodiment a(n unsigned) voucher may be written as:

$$V_i^* = G(F(a_i)) \cdot G(F(a_i+Q)) \qquad (3b),$$

or $$V_i^* = G(F(a_i)) \cdot G(F(a_i+Q)) \cdot G(X) \qquad (3c),$$

in other words, a product of one-way functions. If it is not necessary to determine the identity of a fraudulent user by means of a voucher, the identity Q could be omitted from the voucher, resulting in:

$$V_i^* = G(F(a_i)) \qquad (3d),$$

or even $$V_i^* = F(a_i) \qquad (3e),$$

A serial number or confidential information could be incorporated in the additional information X, but may also be incorporated as concatenated information Y:

$$V_i^* = G(F(a_i), F(a_i+Y|Q)) \qquad (3f),$$

where '|' denotes concatenation.

Instead of 'opening' (k−1) vouchers to the issuer, as described above, a smaller number (k−m) of vouchers could be 'opened', where m is greater than one.

The examples discussed above involved a single merchant M having a single public key M. If the method or system of the present invention involves multiple merchants, they may all use the same public key. This has the clear advantage of simplicity. However, a more secure method and system can be obtained if a product of merchant public keys is used, instead of a single merchant public key.

The method, device and system of the present invention can be adapted for pseudonym systems. In a pseudonym system, the user U and the issuer I together may generate a pseudonym $$P_{UI} = a_I^{x_U} \cdot b_I^{s_{UI}} \qquad (9)$$

where the numbers $a_I$ and $b_I$ are provided by the issuer I (and where the number $a_I$ is not related to the numbers $a_i$ mentioned above), and where only the user U knows the coefficients (that is, exponents) $x_U$ and $s_{UI}$. The issuer therefore knows the resulting pseudonym $P_{UI}$ without knowing $x_U$ and $s_{UI}$.

The method of the invention as described above is further modified in that the user U first produces (unsigned) electronic vouchers $V_i^*$ according to formula (3) above but then modifies these vouchers $V_i^*$ to produce modified (unsigned) electronic vouchers $W_i^*$ according to:

$$W_i^* = g_U^{V_i^*} \cdot h_U^{r_i} \qquad (10),$$

where the coefficients $g_U$ and $h_U$ are only known to the user U, and where $r_i$ is a random number produced by the user U.

The user U then presents these modified electronic vouchers $W_i^*$, instead of the vouchers $V_i^*$, to the issuer I. In response, the issuer will ask the user to "open" e.g. (k−1) vouchers $W_i^*$ by presenting the corresponding values of $r_i$ and $a_i$ similar to the method described above, so that the issuer I can verify these vouchers. The issuer I then signs the remaining electronic voucher $W_i^*$ and gives the signature ($c_I$, $e_I$) to the user, where $$C_I^{e_I} = P_{UI} \cdot d_I \cdot W_i^* \qquad (11),$$

and where $d_I$ is a value known to all parties.

When using an electronic voucher, the user U gives an (unsigned) electronic voucher $V_i^*$ (instead of the signed voucher $V_i$) to the merchant M. Then a proof of knowledge protocol is carried out, in which the user U proves to know the values:

$$x_U, s_{UI}, c_I, e_I, r_i$$

such that $$c_I{}^{eI} = a_I{}^{xU} \cdot b_I{}^{sUI} \cdot d_I \cdot g_I{}^{Vi*} \cdot h_I{}^{ri} \quad (12),$$

where the merchant M knows the numbers $a_I$, $b_I$, $d_I$, $g_I$ and $h_I$ and is able to determine $g_I{}^{Vi*}$.

Then the merchant M requests the user U to show either the first or the second argument of the function G, as before.

The declaration $D_i$ is in this embodiment a digital signature of the merchant M over the ticket $V_i^*$: the signature is ($c_M$, $e_M$), such that $$c_M{}^{eM} = g_M{}^{Vi*} \quad (13).$$

When submitting the declaration, the user U presents her pseudonym $P_{UI}$ and his (blinded) voucher $W_i^*$. Then the user U and the issuer I perform a proof of knowledge protocol, in which the user proves to know the values $$c_M, e_M, V_i^*, r_i,$$

such that $$c_M{}^{eM} = g_M{}^{Vi*} \text{ and } W_i^* = g_I{}^{Vi*} \cdot h_U{}^{ri} \quad (14)$$

where the issuer I knows the numbers $g_M$, $W_i^*$, $g_I$ and $h_I$. In addition, it has to be shown that both instances of $V_i^*$ are equal. In this way, the present invention can be used in pseudonym systems. Those skilled in the art will realise that other pseudonyms than the one given by formula (9) above may be used.

Figure 2:
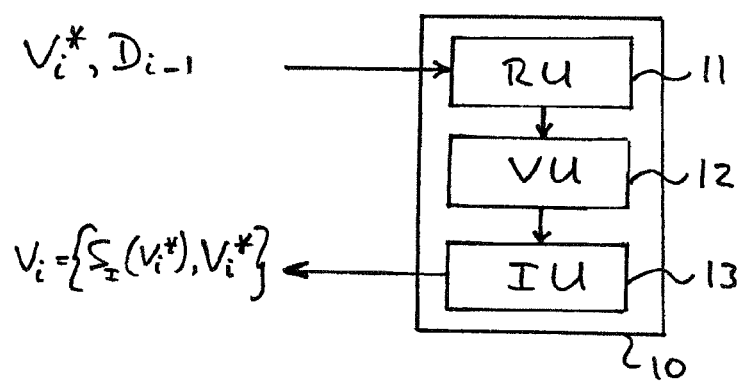
FIG. 2 schematically shows a device for issuing vouchers in accordance with the present invention.

A merely exemplary embodiment of an issuer device I is shown in more detail in FIG. 2. Such an issuer device I may be used in all embodiments of the present invention.

The issuer device 10 shown schematically and merely by way of non-limiting example in FIG. 2 comprises a receiving unit (RU) 11, a verification unit (VU) 12 and an issuing unit (IU) 13. The receiving unit 11 is arranged for receiving an unsigned electronic voucher $V_i^*$ and an electronic declaration $D_i$. The verification unit 12 is arranged for verifying the declaration $D_i$ or, in a preferred embodiment, the blinded declaration $d_i$. The issuing unit 13 is arranged for issuing an electronic voucher by signing the unsigned voucher $V_i^*$.

A user device (U in FIG. 1) according to the present invention may be constituted by an electronic wallet comprising a microprocessor, a memory storing suitable software programs, and an input-output circuit for interfacing with a smart card or similar voucher carrier. More in particular, the user device according to the present invention is capable of producing vouchers and blinding factors, and of checking signatures.

A merchant device (M in FIG. 1) according to the present invention may be constituted by an electronic cash register arranged for electronic payment and may also comprise a microprocessor, a memory storing suitable software programs, and an input-output circuit for interfacing with a smart card or similar voucher carrier. The smart card may be a conventional smart card arranged for storing electronic vouchers.

As mentioned above, the electronic vouchers used in the present invention may be stored in an electronic memory, for example the RAM (Random Access Memory) of a user device or of a merchant device. More in particular, the electronic vouchers and electronic declarations are represented by numbers stored in electronic memory and processed in electronic circuits, for example a (micro)processor. The vouchers preferably have a unique identification, such as a serial number. The signature of a merchant on a spent voucher is proof of the bona fide behaviour of the user. Although the invention has been explained with reference to a single user, a single merchant and a single issuer, it will be understood that most embodiments will involve multiple users, multiple merchants and/or multiple issuers. The invention can be used both on on-line and off-line.

The present invention is based upon the insight that the fraudulent use of electronic vouchers can be significantly reduced by requiring a declaration from a merchant when issuing new vouchers, which declaration is only provided when the user has not committed any fraud. The present invention benefits from the further insight that requiring partial identification information when a voucher is submitted allows the complete identification information to be determined when the same voucher is submitted more than once.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A computer program product comprising computer executable instructions, stored on a non-transitory computer readable medium, for carrying out managing electronic vouchers which a user may submit to a merchant in exchange for goods or services, the computer-executable instructions comprising instructions for carrying out the machine implemented steps of:

issuing, by an issuer, a series of electronic vouchers to a user, the issuer computing, for each electronic voucher of the series, an electronic signature based upon the electronic voucher, the electronic signature being provided to the user;

receiving, by the issuer, an electronic declaration from the user;

computing, by the issuer, whether the electronic declaration comprises an electronic signature by the merchant, of a most recently issued one of the series of electronic vouchers; and issuing, by the issuer, a succeeding one of the series of electronic vouchers that follows the most recently issued one of the series of electronic vouchers only if the electronic declaration comprises said electronic signature by the merchant for the most recently issued one of the series of electronic vouchers.

2. A computer system for issuing electronic vouchers which a user may submit to a merchant in exchange for goods or services, the computer system comprising a non-transitory computer-readable medium including computer-executable instructions that, when executed by a processor of the computer system, cause the computer system to perform the following method steps:

issuing a series of electronic vouchers to a user, and computing, for each electronic voucher of the series, an electronic signature based upon the electronic voucher, the electronic signature being provided to the user;

receiving an electronic declaration from the user;

computing whether the electronic declaration comprises an electronic signature by the merchant of a most recently issued one of the series of electronic vouchers; and issuing a succeeding one of the series of electronic vouchers that follows the most recently issued one of the series of electronic vouchers only if the electronic declaration comprises said electronic signature by the merchant for the most recently issued one of the series of electronic vouchers.

3. The computer system according to claim 2, wherein the method further comprises providing a signature on a first electronic voucher in the series of electronic vouchers for the user in the absence of a declaration.

4. The computer system according to claim 2, wherein the electronic voucher contains the concealed identity of the user, the concealed identity being revealed when an invalid declaration is received.

5. A system for providing goods and/or services in exchange for vouchers, the system comprising a computer system for issuing electronic vouchers which a user may submit to a merchant in exchange for goods or services, the computer system comprising a non-transitory computer-readable medium including computer-executable instructions that, when executed by a processor of the computer system, cause the computer system to perform the following method steps:

issuing a series of electronic vouchers to a user, and computing, for each electronic voucher of the series, an electronic signature based upon the electronic voucher, the electronic signature being provided to the user;

receiving an electronic declaration from the user;

computing whether the electronic declaration comprises an electronic signature by the merchant of a most recently issued one of the series of electronic vouchers; and issuing a succeeding one of the series of electronic vouchers that follows the most recently issued one of the series of electronic vouchers only if the electronic declaration comprises said electronic signature by the merchant for the most recently issued one of the series of electronic vouchers.

* * * * *

UNITED STATES PATENT AND TRADEMARK OFFICE
CERTIFICATE OF CORRECTION

PATENT NO. : 8,468,100 B2
APPLICATION NO. : 12/671462
DATED : June 18, 2013
INVENTOR(S) : Veugen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 236 days.

Signed and Sealed this
Eighth Day of September, 2015

Michelle K. Lee
*Director of the United States Patent and Trademark Office*